United States Patent [19]

Olson et al.

[11] 4,429,660
[45] Feb. 7, 1984

[54] WATER POWERED FISH FEEDER

[76] Inventors: Edward F. Olson, 1961 Merritt, Turlock, Calif. 95380; Robert F. Olson, P.O. Box 847, Summer Lake, Oreg. 97640

[21] Appl. No.: 411,862

[22] Filed: Aug. 25, 1982

[51] Int. Cl.³ .............................................. A01K 5/00
[52] U.S. Cl. ............................. 119/51 R; 119/56 R; 222/334
[58] Field of Search ............... 119/51 R, 51.11, 51.12, 119/51.13, 51.14, 51.5, 56 R, 52 AF, 52 A, 53; 222/334, 368, 463

[56] References Cited

U.S. PATENT DOCUMENTS

| | | | |
|---|---|---|---|
| 1,029,623 | 6/1912 | Nieman | 119/51.5 |
| 1,207,938 | 12/1916 | Kuxmann | 119/51.5 |
| 2,785,831 | 3/1957 | Smolin | 119/51 R |
| 2,800,256 | 7/1957 | Di Nuzzo | 119/51 R |
| 2,966,885 | 1/1961 | Bently | 119/51 R |
| 3,168,224 | 2/1965 | Rios | 222/463 |
| 3,528,588 | 9/1970 | Moore | 119/51 R |
| 3,688,744 | 9/1972 | Kaplan | 119/51.11 |
| 3,730,142 | 5/1973 | Kahrs et al. | 119/51 R |
| 3,874,340 | 4/1975 | Lemond et al. | 119/51 R |
| 4,030,452 | 6/1977 | Keen et al. | 119/52 AF |
| 4,080,929 | 3/1978 | Millnitz | 119/3 |
| 4,089,299 | 5/1978 | Suchowski | 119/51 R |
| 4,130,089 | 12/1978 | Moran | 119/51 R |

FOREIGN PATENT DOCUMENTS 860146  2/1961  United Kingdom ............... 119/51.5

OTHER PUBLICATIONS

Anon, Fish Feeder, Sep. 1975, Published by Elektor.

Primary Examiner—Gene Mancene
Assistant Examiner—Kris R. Schulze
Attorney, Agent, or Firm—Harvey B. Jacobson

[57] ABSTRACT

A fish feeder assembly having at least one water receiving container eccentrically mounted on a rotatable shaft for oscillating the shaft as the container is sequentially filled with water and emptied when the contained and shaft are pivoted by the weight of the water. The assembly includes a frame having an interior portion defining a longitudinal opening, a feed bin having at its lower portion a passageway communicating with the longitudinal opening for passage of fish feed, a metering rotor securedly affixed to the shaft and essentially filling a transverse sectional area of the passageway for rotation whereupon metered portions of fish feed are dispensed from the hopper through the longitudinal opening in the frame. A wing strucuture has a bushing for receiving the shaft in fixed relation thereto and for mounting said at least one water container, the wing structure including a stop pin disposed in general parallel relation to the axis of the shaft and cooperating with an adjustment stop for limiting arcuate movement of the shaft and consequently control the amount of fish food metered by the rotor. The metering rotor may have a set of grooves for metering different amounts of fish feed for a given arcuate displacement.

10 Claims, 5 Drawing Figures

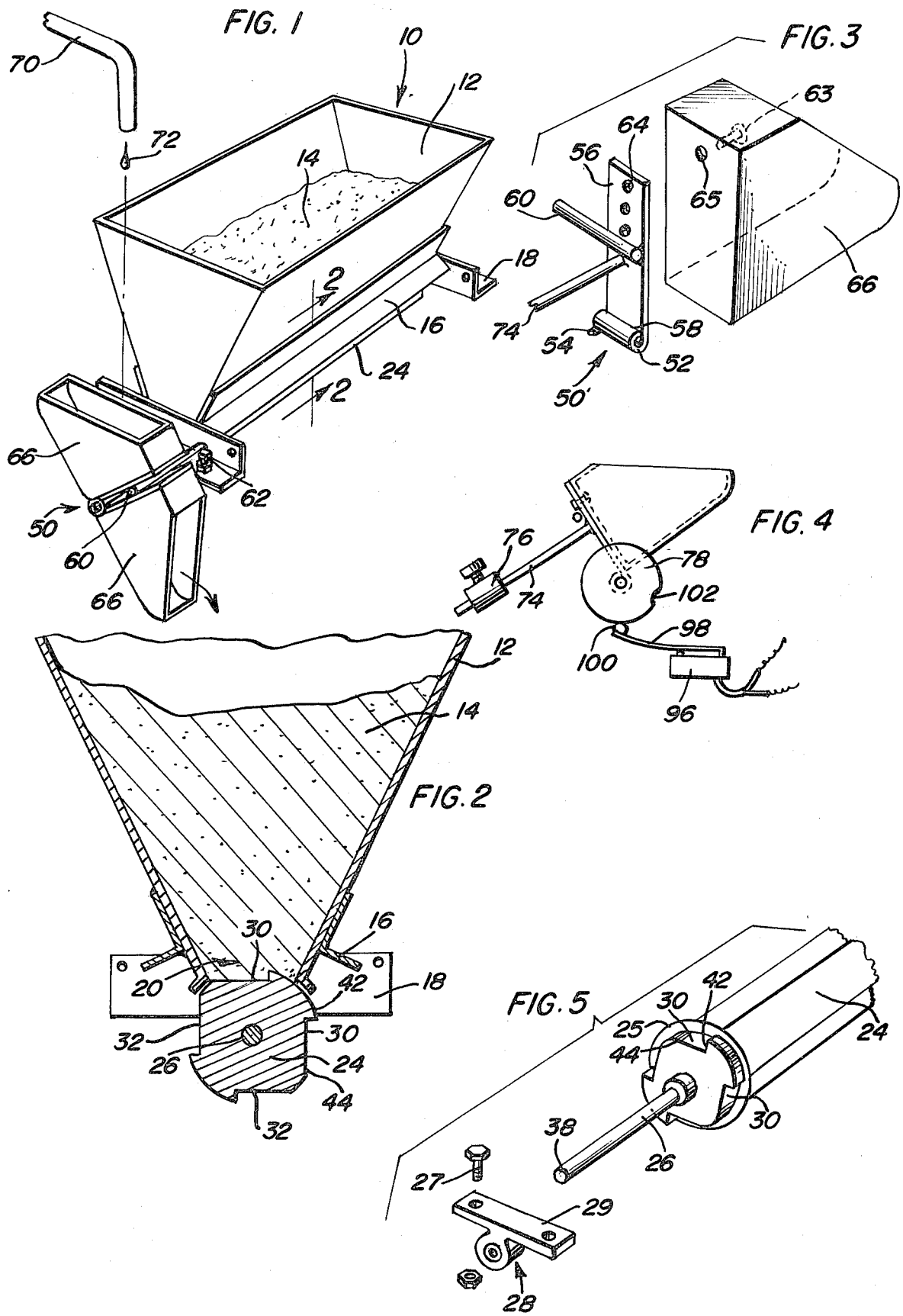

WATER POWERED FISH FEEDER

BACKGROUND OF THE INVENTION

1. Field of the Invention

The present invention relates to fish feeding devices and assemblies for dispensing selected measured quantities of granular feed which drops onto the surface of a fish pond, and which is actuated by water power.

More particularly, the invention is directed to a fish feeder assemblage including a feed bin having its discharge aperture engaging with a metering rotor with two sets of grooves so that oscillating or rotation of the metering rotor about an arc of 90° dispenses fish feed that drops into a pond. The metering rotor is turned by at least one container supported from a scoop or container mounting assembly on a shaft common to the shaft of the metering rotor, the container being filled with water until the container, which has a stable state off-center of the common shaft when the container is empty and when in the dump or emptying state, and passing through the center of gravity on reaching the emptying condition. Also mounted on the container mounting assembly is a stop pin mounted off-center of the shaft and is displaced by movement of the container between its two states and its arcuate displacement is controlled by positions of adjustable stops mounted on a frame assembly supporting the feed bin. Setscrews are provided in the container mounting assembly for stabilizing the shaft and its metering rotor in either of a first or second position according to which pair of grooves are desired to be used in selecting rates of metering due to the different sizes of the sets of grooves. At the ends of the metering rotor are neoprene O-ring elements for restraining feed flow from ends of the opening at the bottom of the feed bin.

2. Description of the Prior Art

Various prior art disclosures relate to fish feeders and of interest to the present invention are the following U.S. patents:

U.S. Pat. No. 2,785,831 to S. Smolin;
U.S. Pat. No. 2,966,885 to R. B. Bentley;
U.S. Pat. No. 3,528,588 to E. M. Moore;
U.S. Pat. No. 3,688,744 to E. S. Kaplan;
U.S. Pat. No. 3,730,142 to J. W. Kahrs et al;
U.S. Pat. No. 3,874,340 to R. H. Lemond et al;
U.S. Pat. No. 4,030,452 to E. M. Keen et al;
U.S. Pat. No. 4,080,929 to R. W. Millnitz;
U.S. Pat. No. 4,089,299 to B. Suchowski;
U.S. Pat. No. 4,130,089 to D. J. Moran.

The patent to Millnitz discloses a rotatable mounted container driven by a paddle wheel sunk into a fish tank and in which air is supplied for driving the paddle wheel in rotary motion. The patent to Moore discloses a fish feeder arrangement for dispensing measured quantities of feed into a fish pond by using air to entrain the feed and discharge it over a large area of the pond. The other patents disclose feed systems of related interest. None of these patents discloses all of the specific details of the present invention in such a way as to bear upon the patentability of any claims of the present invention.

SUMMARY OF THE INVENTION

An object of the present invention is to provide a water powered fish feeder assembly of simple but rugged construction, in which there is essentially one moving assembly supported by two wearing points which may be oilite bushings, and such movement is about a 90° rotation, essentially an oscillation of the shaft about its axis during each cycle of operation, and which provides a wide range of feeding rates.

Another object of the present invention is to provide a simple arrangement in providing a wide range of feeding rates controlled by parameters such as providing at least two sizes of metering grooves in a rotor, adjusting the arcuate displacement of the metering grooves by placement of feed in the hopper so that the maximum rate of feed is distributed when the full length of the hopper contains feed, an intermediate rate when feed is at both ends with the center, for example, empty, or for a minimum rate when feed is placed at only one portion of the hopper, and adjustment of the cycling rate governed by the rate of water flowing or dripping into a scoop or container supported by a container mounting assembly on a shaft that oscillates the metering rotor. Heavy water flow trips the rotor in seconds and retarding the water flow requires longer period of time to oscillate the metering rotor, and the adjustment can be timed and adjusted so that inflow into the container is barely more than evaporation rates of the water in the container.

Another and additional object of the present invention is to provide a feed bin which is capable of handling dry granular feed as well as the newer type that is somewhat and quite oily without clogging the hopper or feed bin, and providing for adjustment of space between the metering rotor and the sides of the feed bin for different sized granular feed. Moisture-laden air that may cause caking of the granular feed in the feed bin is prevented from coming into contact with the feed by using a cover on the feed bin and by raising it as may be desired some distance above the fish tanks or pond. Packing of the feed at bottoms of the hopper or feed bin is prevented by jarring caused when the oscillating drive arrangement impacts against an adjustable stop at the end of the dumping cycle, as well as when it returns to a filled portion of the cycle. Each metering groove is constructed to have a sharp trailing edge rearward of the rotation to provide an improved dispensing of feed as the rotor groove selects the feed and carries it for dumping during each dumping cycle. At an end of the dumping cycle, the bottom of the metering groove on the rotor is in a generally vertical position allowing the feed to drop out directly and easily into the feed area with the jarring action of the stop pin on one of the adjustable stops cleaning the metering groove of the granular feed.

Yet another and additional object of the present invention is to provide ease in cleaning of the metering grooves of the metering rotor should it be required for any reason and this can be done in seconds with a wipe of a damp cloth or other material because the grooves are accessible from the bottom, or from the top when the feed bin is empty.

These together with other objectes and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a generally front perspective view of the water powered fish feeder assembly according to the invention.

FIG. 2 is a sectional view taken along lines 2—2 of FIG. 1.

FIG. 3 is a perspective view of a container mounting assembly for attachment to a single container according to the invention.

FIG. 4 is a sectional view of a modification showing a single container in combination with a microswitch serving as a timer for operating a relay to control solenoids or for recording purposes according to the invention.

FIG. 5 is a perspective view of the metering rotor according to the invention.

DESCRIPTION OF THE PREFERRED EMBODIMENT

Referring now to the drawings, there is shown a water powered fish feeder assemblage 10 having a hopper or feed bin 12 containing granular feed 14 or the like, the feed bin having downwardly converging side walls and being supported by angle iron members 16 bolted or otherwise attached to the outer surfaces of the downwardly sloping walls of the feed bin 12 with transverse angle iron end members 18 supporting the members 16 and feed bin 12 on a frame or other structure (not shown). The feed bin is of generally triangular cross section in configuration shown sectionally along a short dimension thereof, and at the bottom of the feed bin 12 is an elongated slot-like opening or passageway 20 communicating directly with and partially receiving a portion of the periphery of a metering rotor 24 supported on a shaft 26 with bearing assemblies 28 mounted beneath each of the transverse angle iron member 18 for supporting the shaft 26 and rotor 24 for oscillation.

The metering rotor 24 has a first set of grooves 30 on a first half of the metering rotor, and on the other side, there is another set of grooves 32 of differing dimensions. Each set of grooves are dimensioned for providing a given but different amount of granular feed being displaced from the bin 12. The shaft 26 is provided with a key or flat portion 38 on opposite sides of the shaft, shown in FIG. 5, so that setscrews can engage one of the flat portions 38 thereby selecting the appropriate set of grooves 30, 32 accordingly. The grooves 30, 32 are inset from the periphery 40 of the metering rotor 24 and have a radial portion 42 and a chord portion 44 for receiving the granular feed and rotation of the metering rotor provides for the radial portion 42 to push the granular feed within the bin 12 about the axis of the shaft 26 beyond the opening 20 in the bin and when the metering rotor has turned about an arc of approximately 90°, as shown in FIG. 2, the chord portion 44 is in a generally vertical position and the radial portion 42 is in a generally horizontal position, having reached an end of its arcuate rotation or oscillation, and thereby the granular feed is dispensed from the bin 12. The granular feed then drops downwardly therefrom and the emptied groove 32 on the metering rotor is returned into the opening 15 for refilling by reverse rotation of the shaft 26, as is described below, the groove 32 is refilled from granular feed in the bin 12.

The shaft 26 extends beyond one of the bearing assemblies 28 and has sufficient length to receive a scoop or container mounting assembly 50 having a bushing 52 which is secured to the shaft 26 by setscrews 54. A set of two parallel plates or wings 56 or, if only a single container is to be used as in FIG. 3, a single wing 56' is welded to the bushing 52 by weldments 58. A stop pin 60 is welded to the center of the wings 56 or wing 56', the stop pin 60 paralleling shaft 26 and extending toward the feed bin and into engagement with adjustable stop members 62 mounted on the transverse angle iron member 18. The adjustable stop members 62 may be threadedly engaged into a horizontal portion of the transverse angle iron member 18 in the path of the stop pin, and the position of the adjustable stop members 62 provide impact for stopping the arcuate movement of the stop pin since the adjustable stop members threadedly engage with the transverse angle iron member 18 and are provided with locking means (not shown) for locking the adjustable stop members 62 in a position. The stop pin will only travel in an arcuate path with the axis of the shaft 26 as a center and the arcuate path defined by limits of the position provided by the adjustable stop member 62. Outward on the wings 56 or wing 56' from the bushing 52, there are a series of three or more bolt receiving internally threaded apertures 64 for receiving bolts and securing water scoops or containers 66 or a single container in FIG. 3 constructed of a metal or preferably a plastic material and of a contour symmetrical with each other such that they are placed back-to-back in opposing symmetrical relationship about an axis through the shaft 26 central of the wings 56. The entire container mounting assembly 50 forms a single component of its several welded parts from which it is formed. The adjustable stop member 62 adjusts or limits the arcuate path of the stop pin 60 passing from one adjustable stop member 62 to the other, and return, by means of the adjustable stop members being raised or lowered and then fixedly secured onto the horizontal portion of the transverse angle iron member 18. The multiple apertures 64 enable adjustment of container or containers 66 radially of shaft 26 by inserting a threaded fastener 63 through hole 65 in container 66 and one of the apertures 64.

A water source 70 is controlled by a conventionally faucet or valve member (not shown) for dispensing a liquid such as water 72 in a continuous flow or water in droplet form as shown in FIG. 1 until the left container 66 is sufficiently filled to a level shifting the center of gravity from a right side of the shaft 26 across the shaft whereupon the left container 66 will pivot rapidly to the left in a counterclockwise direction about the axis of the shaft 26 and the water collected in the left container 66 is emptied. This action rotates the shaft 26 in a counterclockwise direction about its axis and correspondingly rotates the metering rotor 24 about the shaft for a corresponding arc, approximately 90°, and feed 14 contained within the groove 30 in the bin 12 travels in the groove with a metering rotor 24 counterclockwise until the radial portion 42 of the groove is about horizontally disposed and the chord portion 44 of the groove is generally vertical in orientation where upon the grain drops downwardly into the fish tank or pool (not shown) for feeding fish. Due to the rapid tilting of container 66, the stop pin 60 bangs against stop member 62 thus completely emptying groove 30. The valve connected with the water source 70 may feed the water 72 at a faster rate or slower as the case may be for filling one of the containers 60 such that after the left container 66 has emptied its water as described above, then the right container 66 is in position for being filled, the center of gravity thereof being displaced to the left side of the shaft 26. After sufficient water has flowed into the right container 66 to relocate the center of gravity rightward and as it passes over the axis of the shaft 26, then the right container 66 will drop clockwise for emptying the liquid collected in it, turning the shaft 26 clockwise together with turning the metering rotor 24 clockwise until the stop pin 60 impacts on the right adjustable stop member 62 which stops rotation of the shaft 26. Water is then emptied from right container 66 and water commences to fill the left container 66 and the cycle is repeated.

Details of a single container mounting assembly 50′ are shown in FIG. 3 and is the same as the double container assembly except only one wing 56′ is used and as shown in FIG. 4, an arm 74 and adjustable counterweight 76 are used to return the container 66 to its fill position.

Another use of the device is shown in FIG. 4 in which a disk or wheel 78 is mounted on shaft 26 for oscillation therewith. Associated with the arrangement in FIG. 4 is a microswitch 96 having an arm 98 with a follower 100 riding along the surface of the wheel 78 until it engages with a shallow notch 102 whereupon the switch 96 is actuated. In this way, operating data, timer information, and recording information concerning operation of the water powered fish feeder assemblage 10 is available and converted to electrical data useful in operating or controlling solenoids or other elements such as alarms or control apparatus providing additional feed to the feed bin or other similar uses. FIG. 5 illustrates the O-ring seal 25 at each end of the rotor 24 and illustrates the fastening bolts 27 which secure the pillow blocks 29 for the bearing assemblies 28 to the frame members 18. Shims can be provided between the pillow blocks 29 and the frame members 18 to vary the clearance between periphery of the rotor 24 and the edge of the opening 20 in the bin 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A water powered fish feeder assembly comprising a frame having a longitudinal opening extending along an interior portion of the frame and having at ends thereof a supporting base, a feed bin havng a passageway communicating with the longitudinal opening, the feed bin adapted for containing and storing granular-type fish feed, a shaft mounted for rotation supported by bushings on the supporting base and the shaft extending beyond at least one end thereof, a metering rotor fixedly secured to the shaft and having its diametrical dimension essentially filling a transverse sectional area of the passageway whereby rotation of the shaft in one direction is effective to cause the rotor to dispense a predetermined amount of feed from the feed bin, means mounting at least one container fixedly and eccentrically on the shaft for water collection in the container until a water level is reached whereupon exceeding the water level, the container is tipped about the shaft axis for emptying the container while rotating the shaft and rotor in said one direction through a predetermined rotational increment to dispense said amount of feed, and means to thereafter return the container to its original position accompanied by rotation of the shaft and rotor in the opposite direction, whereupon water is again collected in said at least one water container for repeating the dispensing of said amount of fish feed from the assembly.

2. The invention according to claim 1 wherein a container mounting assembly fixedly secured to the shaft supports the said at least one water container, the container mounting assembly including a bushing secured to the shaft by setscrew means, at least one wing extending from the bushing radially from the shaft for supporting said at least one container, a stop pin mounted at an intermediate point along the wing, means on the frame cooperable with said stop pin for limiting rotational movement of the container mounting assembly as it rotates about the shaft in said one direction, and apertures within the wing for selectively mounting said at least one container along the wing.

3. The invention according to claim 1 wherein said metering rotor contains at least two pairs of grooves in which each pair is differently dimensioned from the others for selectively metering various amounts of feed.

4. The invention according to claim 1 wherein a notched wheel is fixedly secured to the shaft having a shallow notch therein, a microswitch for connection to a data recorder, the microswitch having a pivotal arm with an end following the surface of the notched wheel and for changing the state of contacts of the microswitch when the arm is received in the shallow notch for recording data each time the feeder is operated.

5. The invention according to claim 1 wherein the means to return the container to its original position comprises a second container mounted eccentrically on the shaft to receive water therein when the shaft has been rotated through said predetermined increment until a predetermined water level is reached whereupon exceeding said level the further container is tipped about the shaft axis for exmptying the further container while rotating the shaft in reverse direction.

6. The invention according to claim 1 wherein the means to return the container to its original position comprises a counterweight associated with the container.

7. A water powered fish feeder assemblage comprising a metering rotor for dispensing granular feed from a feed bin, the metering rotor fixedly secured on a rotatable shaft, another portion of the shaft having a container mounting assembly means mounting at least one container thereon the container tipping about the axis of the shaft from an initial position so as to rotate the shaft and thereby operate the rotor when the container is filled with water to a predetermined level to dispense a predetermined amount of feed from said bin and a stop having first and second ends, said first end fixedly secured to said mounting assembly means, said second end provided for engagement with at least one adjustable stop member for restricting the rotational movement of the shaft about its axis and means to thereafter to return the container to said initial position accompanied by rotation of the shaft and rotor in the opposite direction, whereupon water is again collected in said at least one container for repeating the dispensing of said amount of feed from the bin.

8. The invention according to claim 7 and in which a counterweight is mounted on the container mounting assembly means for returning the shaft and rotor to the initial position.

9. The invention according to claim 8 wherein the shaft also supports in fixed relation a notched wheel having a shallow notch, an arm of a microswitch following the surface of the notched wheel and when it is received in the shallow notch thereof, an electrical state of the microswitch is altered accordingly to signal operation of the rotor.

10. The invention according to claim 7 wherein said container mounting assembly means includes a plate connected with and extending radially from said shaft, said stop being secured to said plate extending therefrom to engage a stop member, the and container being adjustably attached to said plate to support the container in an adjustable eccentric relation to the axis of the shaft.

* * * * *